US008548665B2

(12) United States Patent
Izumi et al.

(10) Patent No.: US 8,548,665 B2
(45) Date of Patent: Oct. 1, 2013

(54) MOVABLE BODY SYSTEM

(75) Inventors: Tetsuro Izumi, Fukuoka (JP); Dai Kouno, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 292 days.

(21) Appl. No.: 13/048,906

(22) Filed: Mar. 16, 2011

(65) Prior Publication Data
US 2011/0304858 A1    Dec. 15, 2011

(30) Foreign Application Priority Data

Jun. 10, 2010   (JP) ................................. 2010-133151

(51) Int. Cl.
*G05D 1/00*   (2006.01)

(52) U.S. Cl.
USPC ............... 701/23; 701/26; 701/523; 701/514; 318/587; 356/615

(58) Field of Classification Search
USPC ............ 356/614–623; 700/259; 901/1, 901/47; 318/587; 701/1, 23, 25, 200–202, 701/26, 523, 514, 408
See application file for complete search history.

(56) References Cited

U.S. PATENT DOCUMENTS

| 6,359,955 | B1 | 3/2002 | Nukui |
| 7,031,805 | B2 | 4/2006 | Lee et al. |
| 7,218,994 | B2 | 5/2007 | Kanda et al. |
| 7,515,991 | B2 | 4/2009 | Egawa et al. |
| 8,473,141 | B2 * | 6/2013 | Kouno ............................. 701/23 |
| 2002/0091466 | A1 * | 7/2002 | Song et al. ..................... 700/245 |
| 2002/0156556 | A1 | 10/2002 | Ruffner |
| 2004/0093650 | A1 | 5/2004 | Martins et al. |
| 2005/0267631 | A1 * | 12/2005 | Lee et al. ........................ 700/245 |
| 2007/0156286 | A1 | 7/2007 | Yamauchi |
| 2007/0198128 | A1 | 8/2007 | Ziegler et al. |
| 2007/0212667 | A1 * | 9/2007 | Jung et al. ..................... 433/223 |
| 2007/0291130 | A1 * | 12/2007 | Broggi et al. ............. 348/218.1 |

(Continued)

FOREIGN PATENT DOCUMENTS

| EP | 0649709 | 4/1995 |
| JP | 2003-280738 | 10/2003 |

(Continued)

OTHER PUBLICATIONS

Japanese Office Action for corresponding JP Application No. 2010-133151, Jul. 24, 2012.

(Continued)

*Primary Examiner* — Hoa Pham
(74) *Attorney, Agent, or Firm* — Ditthavong Mori & Steiner, P.C.

(57) ABSTRACT

A movable body system includes a movable body to which an image pickup apparatus is attached; an image analyzer that performs image matching between the image captured by the image pickup apparatus and an image, which is previously captured on the travel path of the movable body; a wall-surface detector that detects directions of the movable body with respect to wall surfaces, which are arranged along the travel path, and distances between the wall surfaces and the movable body; and a traveling-direction calculator that detects a shift of the movable body with respect to the travel path from an output of the image analyzer or the wall-surface detector, and calculates a traveling direction to cause the movable body to travel on the travel path.

4 Claims, 6 Drawing Sheets

(56) References Cited

U.S. PATENT DOCUMENTS

| | | | |
|---|---|---|---|
| 2008/0079383 A1* | 4/2008 | Nakamoto | 318/587 |
| 2009/0149991 A1* | 6/2009 | Sumida et al. | 700/246 |
| 2009/0210092 A1* | 8/2009 | Park et al. | 700/259 |
| 2010/0138042 A1* | 6/2010 | Kouno et al. | 700/259 |
| 2010/0152944 A1* | 6/2010 | Kouno et al. | 701/26 |

FOREIGN PATENT DOCUMENTS

| | | |
|---|---|---|
| JP | 2004-237075 | 8/2004 |
| JP | 2004-275468 | 10/2004 |
| JP | 2006-293975 | 10/2006 |
| JP | 2009-052924 | 3/2009 |
| WO | WO 2004/031878 | 4/2004 |
| WO | 2008/073518 | 6/2008 |

OTHER PUBLICATIONS

Extended European Search Report for corresponding EP Application No. 11157116.2-1239, Dec. 5, 2012.

* cited by examiner

MOVABLE BODY SYSTEM

CROSS-REFERENCE TO RELATED APPLICATION

The present application claims priority under 35 U.S.C. §119 to Japanese Patent Application No. 2010-133151, filed Jun. 10, 2010. The contents of this application are incorporated herein by reference in their entirety.

BACKGROUND OF THE INVENTION

1. Field of the Invention

The present invention relates to a movable body system.

2. Description of the Related Art

A movable body that autonomously travels for conveyance of products and members is used in a production factory or the like to achieve labor savings. In many cases, such a movable body travels along a guide rail, such as a reflection tape or a magnet tape, which is arranged on a floor. A movable body that does not use the guide rail is recently suggested. Japanese Patent Laid-Open Publication No. 2006-293975 and Japanese Patent Laid-Open Publication No. 2009-052924 describe specific examples of movable bodies.

The movable body described in Japanese Patent Laid-Open Publication No. 2006-293975 obtains a travel-path via point during traveling based on the relationship between the traveling direction of the movable body and the position and shape of an object that is present within a predetermined distance to the front in the traveling direction, and calculates an expected travel path by using the obtained travel-path via point. The movable body described in Japanese Patent Laid-Open Publication No. 2009-052924 captures an image of a marker that is arranged around a travel path, and recognizes the position and posture of the movable body based on previously stored position information and direction information of the marker.

SUMMARY OF THE INVENTION

According to one aspect of the present invention, a movable body system includes a movable body to which an image pickup apparatus is attached; an image analyzer that performs image matching between the image captured by the image pickup apparatus and an image, which is previously captured on the travel path of the movable body; a wall-surface detector that detects a direction of the movable body with respect to a wall surface, which is arranged along the travel path, and a distance between the wall surface and the movable body; and a traveling-direction calculator that detects a shift of the movable body with respect to the travel path from an output of the image analyzer or the wall-surface detector, and calculates a traveling direction to cause the movable body to travel on the travel path.

BRIEF DESCRIPTION OF THE DRAWINGS

The present invention will be described in further detail with reference to the accompanying drawings wherein.

DETAILED DESCRIPTION OF THE EMBODIMENT

Now, embodiments, in which the present invention is implemented, will be described below to promote understanding of the present invention with reference to the accompanying drawings.

Figure 1A:
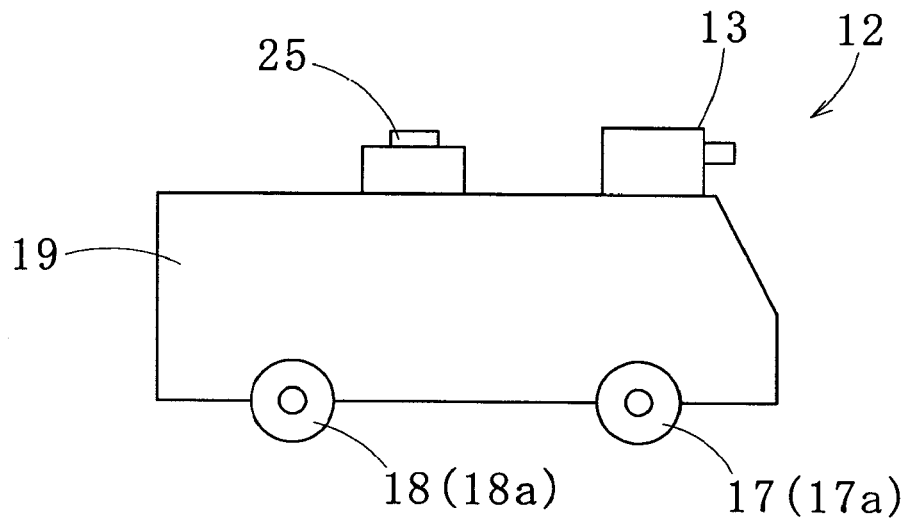
FIG. 1A is a side view showing a movable body of a movable body system according to an embodiment of the present invention.
Figure 1B:
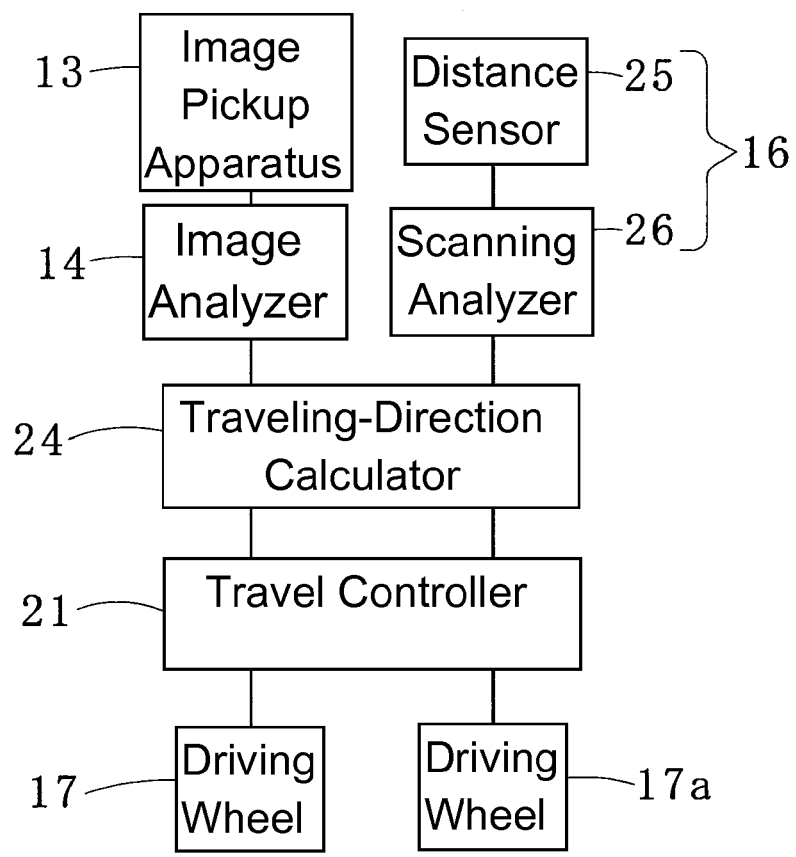
FIG. 1B is a block diagram showing the movable body system while part of the system is not illustrated.
Figure 2:
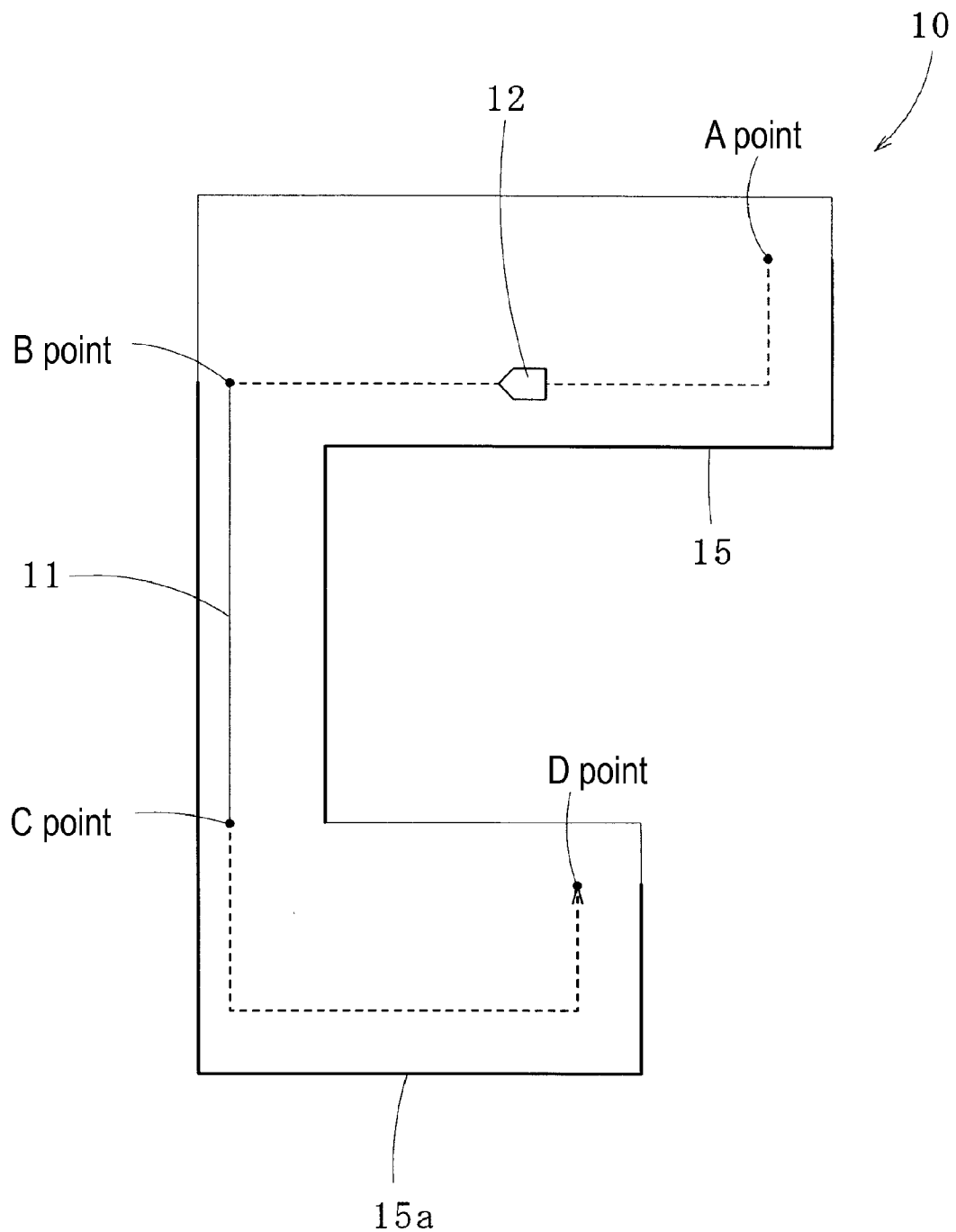
FIG. 2 is an explanatory view showing a travel path for the movable body of the movable body system.

Referring to FIGS. 1A, 1B, and 2, a movable body system 10 according to an embodiment of the present invention is used in a factory, an office, a hospital, a commercial facility, etc., and causes a movable body 12 to travel along a predetermined travel path 11.

The movable body system 10 includes the movable body 12 to which an image pickup apparatus (one example is an optical camera) 13 that captures an image of an external environment is attached, and an image analyzer 14 that performs matching between an image, which is being captured by the image pickup apparatus 13, and an image, which is previously captured on the travel path 11 of the movable body 12. Further, the movable body system 10 includes a wall-surface detector 16 that detects directions of the movable body 12 with respect to wall surfaces 15 and 15a, which are arranged along the travel path 11, and distances between the wall surfaces 15 and 15a and the movable body 12. The details will be described below.

Referring to FIGS. 1A, 1B, and 2, the movable body 12 that travels on the travel path 11 includes a body section 19 having driving wheels 17 and 17a at one side (front side) of a lower portion, and driven wheels 18 and 18a at the other side (rear side) of the lower portion. The body section 19 includes a travel controller 21. The travel controller 21 controls the angular speed and direction of the driving wheels 17 and 17a. The movable body 12 can move forward and backward, and change the direction thereof through the control of the driving wheels 17 and 17a by the travel controller 21.

The image pickup apparatus 13 is arranged at a high position of the body section 19 such that the movable body 12 is not included in an image to be captured. The image pickup apparatus 13 is attached to the movable body 12 such that the image-capturing direction is changed in accordance with the direction of the driving wheels 17 and 17a. The image pickup apparatus 13 captures an image of an external environment in the traveling direction of the body section 19.

The image analyzer 14 is included in the body section 19 and can store a plurality of images captured by the image pickup apparatus 13 when the body section 19 travels on the travel path 11.

The image analyzer 14 performs matching (pattern matching) between a current image, which is being captured by the image pickup apparatus 13 (hereinafter, also referred to as "actual image"), and a plurality of images, which are previously captured on the travel path 11 and stored (hereinafter, also referred to as "stored image"). The image analyzer 14 extracts a feature point (shape, pattern, etc.) that can be identified from the actual image, and performs the matching between the actual image and the plurality of stored images based on the feature point for the identity of these images.

The image analyzer 14 selects one of the stored images judged identical with the actual image as the result of the matching, compares the position of the feature point in the selected stored image with the position of the feature point in the actual image, and detects a shift of the actual image with respect to the selected stored image.

Figure 3:
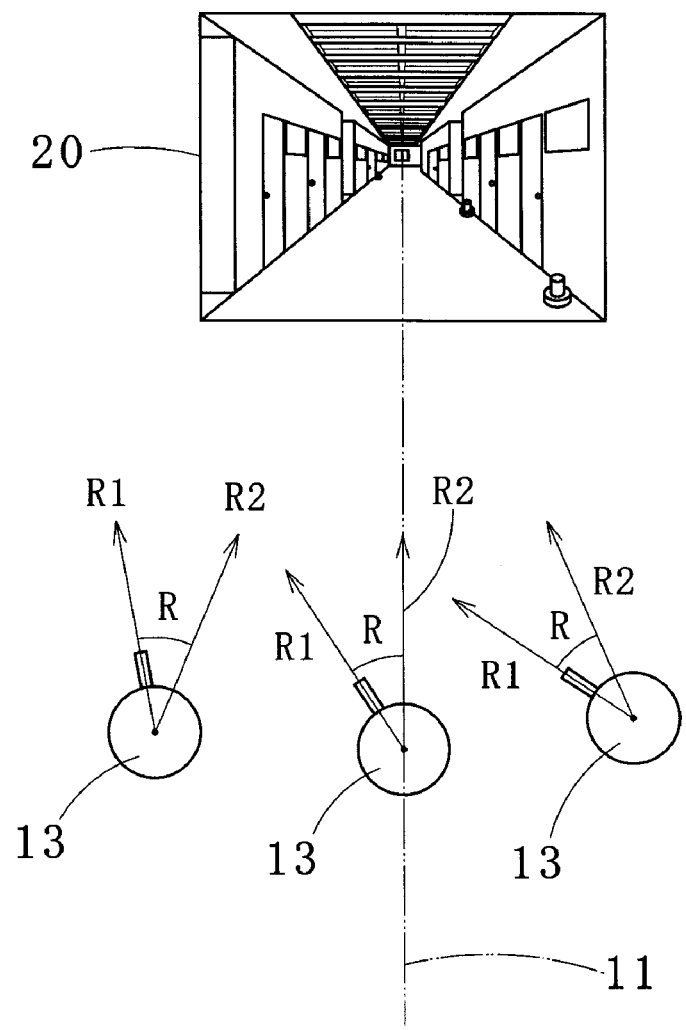
FIG. 3 is an explanatory view showing the relationship between an image-capturing direction of an image pickup apparatus and the position of the movable body of the movable body system.

Referring to FIG. 3, assuming that a stored image 20 is the selected stored image, R1 is a current image-capturing direction of the image pickup apparatus 13 that captures the actual image, and R2 is an image-capturing direction of the image pickup apparatus 13 for capturing the same image as the stored image 20 from the current position, the image analyzer 14 calculates an angle (angular difference) R of the direction R2 with respect to the direction R1 based on the shift of the actual image with respect to the stored image 20.

A method of calculating the angle R will be described below.

Figure 4A:
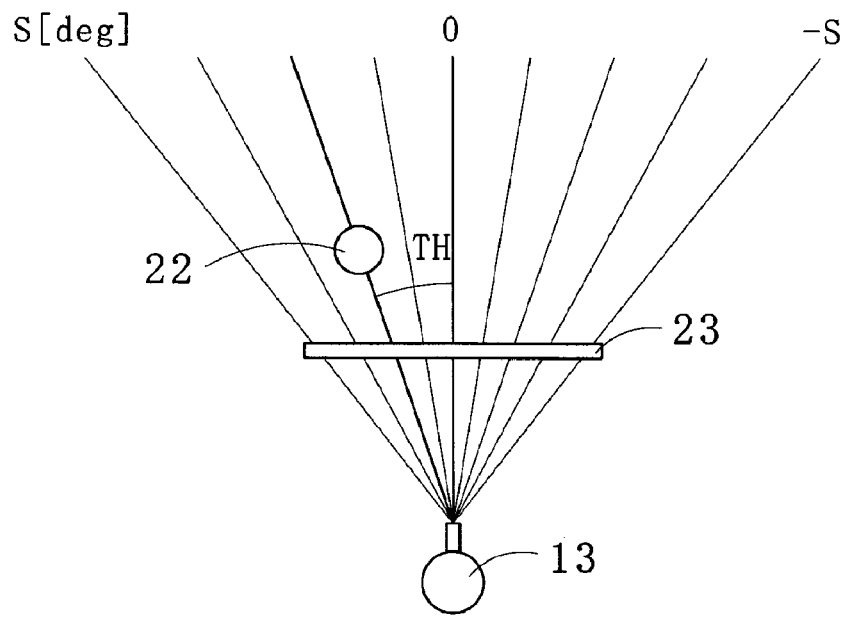
FIGS. 4A and 4B are explanatory views showing the relationship between the position in an image that is captured by the image pickup apparatus and the image-capturing direction.
Figure 4B:
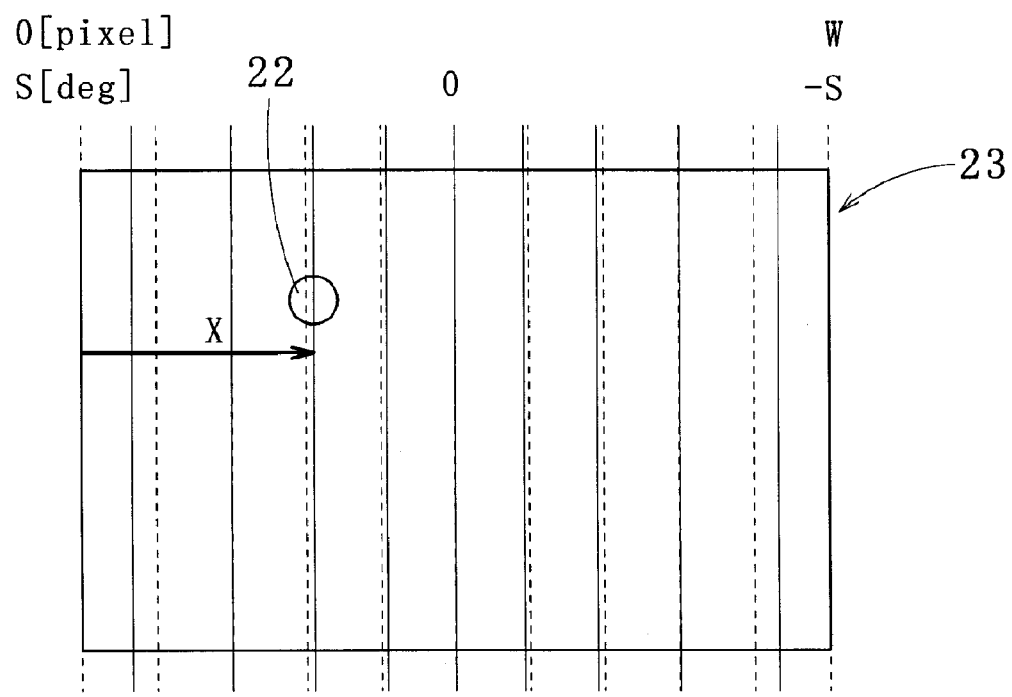

Referring to FIGS. 4A and 4B, assuming that a feature point 22 is present within an image-capturing range of the image pickup apparatus 13, the feature point 22 appears in an actual image 23. In plan view, when an angular position of the center of the image-capturing direction of the image pickup apparatus 13 in the actual image 23 is 0 degrees, angular positions at left and right ends of the actual image 23 are respectively S and −S degrees, horizontal pixel positions at left and right ends of the actual image 23 are respectively 0 pixel and W pixel, and an angular position and a horizontal pixel position of the feature point 22 are respectively TH degrees and X pixel, Expression 1 is established as follows:

$$\tan(TH)=(1-2\times X/W)\times \tan(S) \qquad (1).$$

With Expression 1, it is found that the angular position of the feature point 22 can be obtained from the horizontal image position of the feature point 22 in the actual image 23. Alternatively, Expression 1 may be applied to the stored image.

In FIGS. 4A and 4B, the unit for the angular position is "deg," and the unit for the pixel position is "pixel." In FIG. 4B, vertical solid lines represent the angular positions, and vertical broken lines represent the pixel positions.

The image analyzer 14 detects the horizontal pixel position of the feature point 22 in the actual image 23 and the horizontal pixel position of the same feature point 22 in the stored image 20, the feature point 22 appearing in both the actual image 23 and the stored image 20. The image analyzer 14 calculates the angular position of the feature point 22 based on the horizontal pixel position of the feature point 22 by using Expression 1, for each of the actual image 23 and the stored image 20. Hence, the image analyzer 14 can obtain the angle R from the difference between the angular positions of the feature point 22.

If the angle R is 0 (zero) degrees, the body section 19 (movable body 12) that is capturing the actual image 23 is located at the position of the body section 19 when the stored image 20 is captured, and consequently the body section 19 travels on the travel path 11.

In contrast, referring to FIG. 3, if the angle R is not 0 degrees, the body section 19 does not travel on the travel path 11. The body section 19 includes a traveling-direction calculator 24. The traveling-direction calculator 24 derives the traveling direction of the body section 19. The traveling-direction calculator 24 detects whether the body section 19 travels on the travel path 11 or not with reference to the value of the angle R.

If the angle R is not 0 degrees, the position and image-capturing direction of the image pickup apparatus 13 with respect to the travel path 11 are not determined only from the value of the angle R. The same can be said for the position and traveling direction of the body section 19 with respect to the travel path 11. Thus, the traveling-direction calculator 24 cannot use the position or traveling-direction of the body section 19 with respect to the travel path 11 in order to calculate the traveling direction of the body section 19.

In contrast, if the angle R is 0 degrees, the body section 19 travels on the travel path 11. Hence, it is found that the body section 19 travels on the travel path 11 if the traveling direction of the body section 19 is controlled such that the angle R becomes 0 degrees.

The traveling-direction calculator 24 only references the angle R, and if the angle R is a value other than 0 degrees, the traveling-direction calculator 24 detects that angle R as a shift of the body section 19 with respect to the travel path 11. If the traveling-direction calculator 24 detects the shift of the angle R, the traveling-direction calculator 24 calculates the traveling direction of the body section 19 with the angle R being 0 degrees, and transmits the calculated value to the travel controller 21. The travel controller 21 controls the driving wheels 17 and 17a such that the body section 19 travels along the traveling direction calculated by the traveling-direction calculator 24.

The traveling-direction calculator 24 can also detect the shift of the body section 19 with respect to the travel path 11 based on the traveling directions of the body section 19 with respect to the wall surfaces 15 and 15a (see FIG. 2) and the distances between the wall surfaces 15 and 15a and the body section 19. This is because the wall surfaces 15 and 15a provided in the movable body system 10 are arranged along the travel path 11 with gaps between the wall surfaces 15 and 15a and the travel path 11.

Referring to FIGS. 1A and 1B, the body section 19 includes the wall-surface detector 16. The wall-surface detector 16 includes a distance sensor 25 that detects an object present within a predetermined distance from the body section 19, and a scanning analyzer 26 that detects the presence of the wall surface 15 (or wall surface 15a) from an output of the distance sensor 25.

Figure 5A:
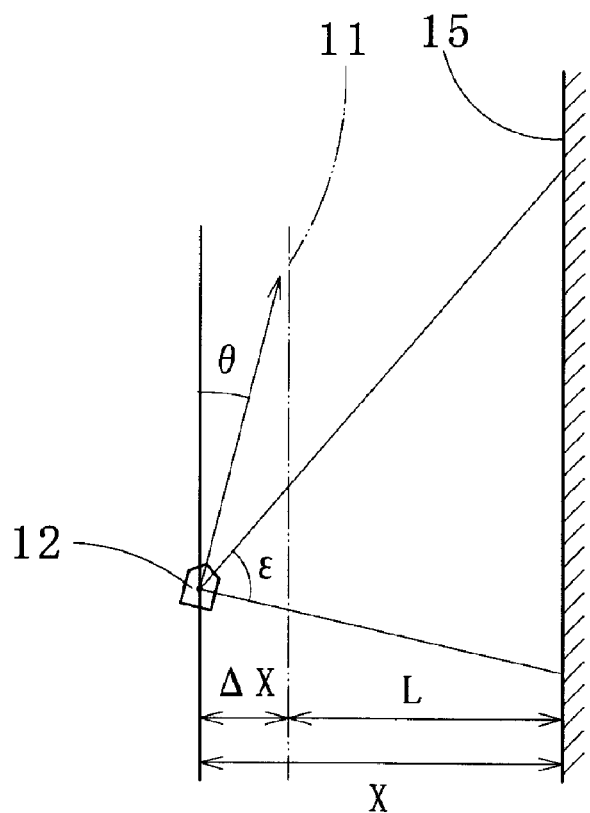
FIGS. 5A and 5B are explanatory views each showing detection of a wall surface by a wall-surface detector of the movable system.
Figure 5B:
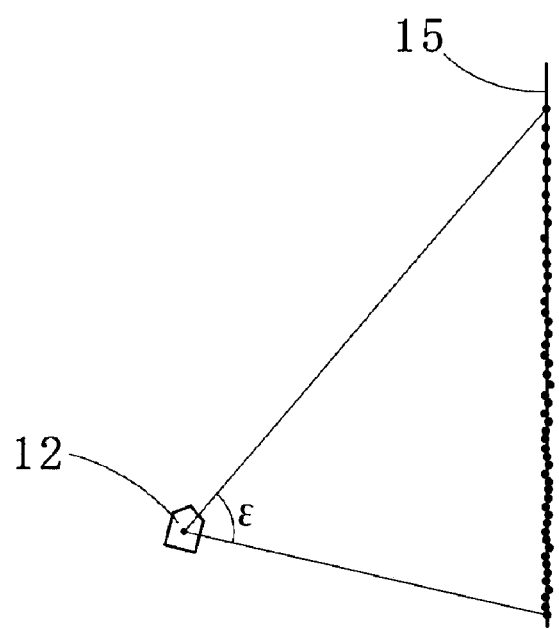

Referring to FIGS. 5A and 5B, the distance sensor 25 emits laser light to spread at a predetermined angle within a predetermined angular range (angle ε) in plan view. The distance sensor 25 receives laser light reflected by an object present within a predetermined distance from the body section 19 (hereinafter, referred to as "reflected laser light"). The distance sensor 25 obtains the position of the object that reflects the laser light, with respect to the distance sensor 25, from the received reflected laser light. Then, the distance sensor 25 obtains the shape of the object by a least-square method. A plurality of dots plotted in FIG. 5B indicate reflection portions of the laser light.

The scanning analyzer 26 acquires information of the shape and position of the object that reflects the laser light, from the distance sensor 25. The scanning analyzer 26 detects that the object is a wall surface if the shape of the object has a straight portion with a length equal to or larger than a predetermined length in plan view (i.e., if the scanning analyzer 26 detects that the reflected laser light contains information of the straight portion with the length equal to or larger than the predetermined length in plan view).

The scanning analyzer 26 obtains a distance X between the distance sensor 25 (movable body 12) and the wall surface 15, and an angle θ of the traveling direction of the body section 19 with respect to the wall surface 15, from the position and shape of the object that reflects the laser light.

The traveling-direction calculator 24 stores a distance L between the wall surface 15 and the travel path 11. The traveling-direction calculator 24 acquires information of the distance X from the scanning analyzer 26, obtains a difference ΔX between the distance X and the distance L, and acquires the information of the angle θ from the scanning analyzer 26. To cause the body section 19 traveling on a path deviated from the travel path 11 to travel along the wall surface 15 (i.e., on the travel path 11), the traveling-direction calculator 24 calculates the traveling direction of the body section 19 such that both the difference ΔX and the angle θ become 0. The travel controller 21 controls the driving wheels 17 and 17a such that the body section 19 travels in accordance with the calculated result of the traveling-direction calculator 24.

Figure 6A:
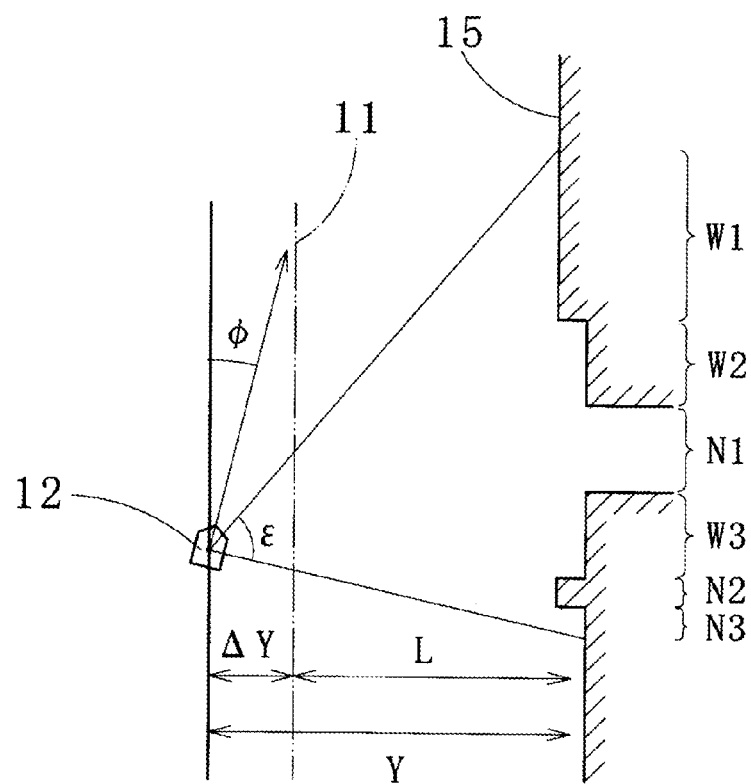
FIGS. 6A and 6B are explanatory views each showing detection of a wall surface by the wall-surface detector of the movable system.

The wall surface 15 includes a region containing a straight portion located at a constant distance from the travel path 11 in plan view as shown in FIG. 5A, and a region containing, for example, a protruding portion and a step portion as shown in FIG. 6A.

Figure 6B:
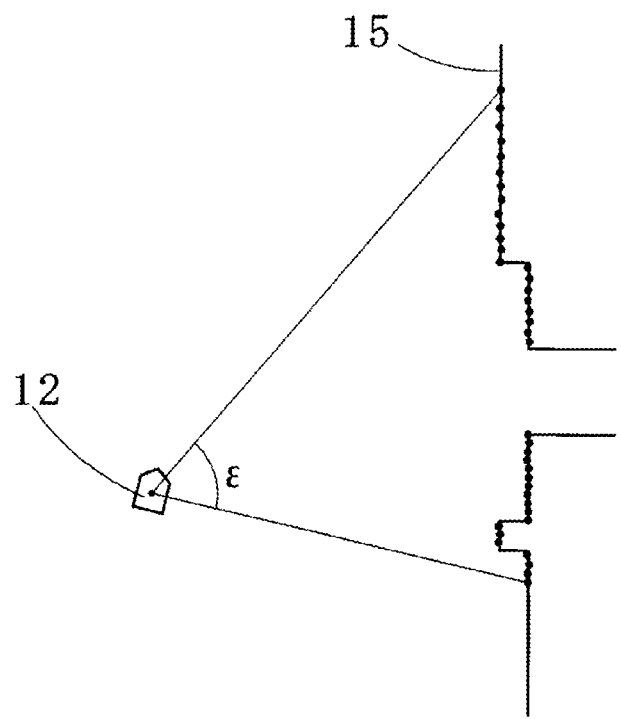

Referring to FIGS. 6A and 6B, reference signs W1, W2, and W3 denote portions that are determined as a wall surface by the scanning analyzer 26 with reference to the information of the reflected laser light. In other words, the portions are straight portions with lengths equal to or larger than the predetermined length in plan view. In a region indicated by N1 in FIG. 6A, the wall surface 15 is discontinued. In regions indicated by N2 and N3 shown in FIG. 6A are straight portions with lengths smaller than the predetermined length in plan view, and hence the scanning analyzer 26 determines that the portions are not a wall surface.

The scanning analyzer 26 detects the presence of objects in the regions W1 to W3, N2, and N3 in the irradiation range of the laser light, from the output of the distance sensor 25. The scanning analyzer 26 extracts only the portions that are determined as the wall surface, namely, the regions W1 to W3, from among the regions W1 to W3, N2, and N3. The scanning analyzer 26 obtains a distance Y1 between an extension line of the region W1 and the distance sensor 25, a distance Y2 between an extension line of the region W2 and the distance sensor 25, and a distance Y3 between the region W3 and the distance sensor 25.

If the distances Y1 to Y3 are not the same value, the scanning analyzer 26 detects that the regions W1 to W3 with different distances to the travel path 11 are present in the wall surface 15, and calculates an average value of the distances Y1 to Y3. The scanning analyzer 26 derives the average value of the distances Y1 to Y3 as a distance Y between the wall surface 15 and the distance sensor 25, and transmits the derived value to the traveling-direction calculator 24. The traveling-direction calculator 24 calculates a difference ΔY between the distance Y and the stored distance L.

The wall surface 15 includes portions with different distances to the travel path 11 like the portions including the regions W1 to W3 shown in FIG. 6A. For such portions, the distance L that is stored in the traveling-direction calculator 24 is calculated from the average value of the distances between the travel path 11 and the regions W1 to W3.

The scanning analyzer 26 obtains angles φ1 to φ3 of the traveling direction of the body section 19, respectively for the regions W1 to W3, from the information of the positions and shapes of the regions W1 and W2, calculates an average angle φ of the angles φ1 to φ3, and transmits the information of the angle φ to traveling-direction calculator 24.

The traveling-direction calculator 24 controls the travel of the body section 19 such that the difference ΔY and the angle φ become 0 and the body section 19 travels on the travel path 11.

The angle φ is the average angle of the angles φ1 to φ3. Even if the angle φ is 0 degrees, the body section 19 may not travel on the travel path 11 in a strict sense. However, by controlling the travel of the body section 19 such that the angle φ becomes 0 degrees, the body section 19 substantially travels on the travel path 11.

The image analyzer 14, the travel controller 21, the traveling-direction calculator 24, and the scanning analyzer 26 are, for example, programs installed in a microcomputer, and the microcomputer is contained in the body section 19.

Next, a process in which the body section 19 (movable body 12) autonomously travels on the travel path 11 connecting A, B, C, and D points in FIG. 2 will be described.

The wall surface 15 is arranged along a section between the A and B points on the travel path 11 with a gap between the wall surface 15 and the travel path 11. The wall surface 15a is arranged along a section between the B and D points on the travel path 11 with a gap between the wall surface 15a and the travel path 11.

For preparation of autonomous traveling of the body section 19, an operator captures images by the image pickup apparatus 13 at a plurality of positions on the travel path 11 while moving the body section 19 on the travel path 11 through manual operation or the like. The images captured by the image pickup apparatus 13 are stored in the image analyzer 14, and the preparation is completed.

In sections between the A and B points and between the C and D points, the traveling-direction calculator 24 basically calculates the traveling direction of the body section 19 from the output value of the image analyzer 14. The traveling-direction calculator 24 uses the output value of the scanning analyzer 26 as an input for calculating the traveling direction of the body section 19 only when the image analyzer 14 cannot select the stored image corresponding to the actual image.

The situation in which the image analyzer 14 cannot select the stored image corresponding to the actual image occurs when an image captured from the same position changes with time, for example, by the influence of sunlight.

If the image analyzer 14 becomes not able to select the stored image corresponding to the actual image when the body section 19 travels in the sections between the A and B points and between the C and D points, the image analyzer 14 transmits a signal indicative of failure of the image matching to the traveling-direction calculator 24. When the traveling-direction calculator 24 receives the signal indicative of the failure of the image matching from the image analyzer 14, the traveling-direction calculator 24 changes the source, from which the traveling-direction calculator 24 receives the output signal for calculating the traveling direction of the body section 19, to the scanning analyzer 26. When the image analyzer 14 becomes able to select the stored image corresponding to the actual image, the source, from which the traveling-direction calculator 24 receives the output signal, is changed back to the image analyzer 14.

In the section between the B and C points, only few feature objects are present in the traveling direction, and the traveling direction extends along the straight path. Even when the body section 19 travels, the images captured by the image pickup apparatus 13 substantially do not change. Since the images captured by the image pickup apparatus 13 only slightly change, the traveling-direction calculator 24 may have a difficulty in judgment for the self position between the B and C points.

Thus, the traveling-direction calculator 24 is previously set to calculate the traveling direction of the body section 19 along the wall surface 15a with reference to only the output of the scanning analyzer 26 in the section between the B and C points.

Images of the external environment viewed from the B and C points are captured during the preparation process, and the captured images are stored in the image analyzer 14. The wall surface 15 is discontinued at the C point, and the images captured by the image pickup apparatus 13 markedly change around the arrival of the body section 19 at the C point.

When it is detected that the body section 19 passes the B point or the C point as the result of the comparison between the actual image and the stored image by the image analyzer 14, the traveling-direction calculator 24 changes the source, from which the traveling-direction calculator 24 receives the output signal for calculating the traveling direction of the body section 19, from the image analyzer 14 to the wall-surface detector 16, or from the wall-surface detector 16 to the image analyzer 14.

With this embodiment, the traveling direction of the movable body can be calculated with reference to the wall surface, at a position where the image analyzer 14 cannot perform the image matching.

Also, an object other than the wall surface, the object which should not be referenced as an input for determining the traveling direction of the movable body when information of a straight portion with a length equal to or larger than a predetermined length in plan view is contained, can be eliminated from reference information. Further, when regions with different distances to the travel path in plan view are detected from the wall surface, if an average distance of distances between the regions or extension lines of the regions and the movable body is derived as a distance between the wall surface and the movable body, the wall-surface detector can derive the distance between the wall surface and the movable body, the distance which is necessary for calculating the traveling distance of the movable body, from the wall surfaces with the different distances to the travel path.

The embodiment of the present invention has been described above, however, the present invention is not limited to the above-described embodiment, and modification etc. within the scope of the present invention is included in the range of application of the present invention.

For example, the image analyzer and the traveling-direction calculator do not have to be provided in the movable body, and may be provided in a device available for data communication with the movable body.

For example, in the section between the B and C points of this embodiment, the arrival at the C point may be judged when it is detected that the wall surface is discontinued, from the output of the scanning analyzer.

Alternatively, the arrival at the C point may be judged by detecting a length of a wall surface present in front of the movable body and performs matching between the length and previously input information.

What is claim is:

1. A movable body system comprising:
an image pickup apparatus configured to capture an image of an external environment;
a movable body to which the image pickup apparatus is attached, the movable body including a driving wheel and being provided to travel along a predetermined travel path, the image pickup apparatus being configured to capture the image of the external environment so that an image-capturing direction of the image pickup apparatus is changed in accordance with a direction of the driving wheel;
an image analyzer that performs image matching between the image captured by the image pickup apparatus and an image, which is previously captured on the travel path of the movable body;
a wall-surface detector configured to detect that an object is a wall surface if a shape of the object that reflects laser light emitted from the movable body has a straight portion with a length equal to or larger than a predetermined length in plan view, the wall-surface detector being configured to detect a direction of the movable body with respect to a wall surface, which is arranged along the travel path, and a distance between the wall surface and the movable body; and
a traveling-direction calculator that detects a shift of the movable body with respect to the travel path from an output of the image analyzer or the wall-surface detector, and calculates a traveling direction to cause the movable body to travel on the travel path, the traveling-direction calculator being configured to change a source for calculating the traveling direction from the image analyzer to the wall-surface detector if the traveling-direction calculator receives, from the image analyzer, a signal that indicates that the image captured by the image pickup apparatus does not match the image previously captured on the travel path of the movable body.

2. The movable body system according to claim 1, wherein the image analyzer transmits a signal indicative of failure of the image matching if the image matching is disabled between the image captured by the image pickup apparatus and the image previously captured on the travel path, to the traveling-direction calculator, and changes a source, from which the traveling-direction calculator receives an output signal, from the image analyzer to the wall-surface detector.

3. The movable body system according to claim 1, wherein the wall-surface detector emits laser light and detects a position of the wall surface from reflected laser light.

4. The movable body system according to claim 3, wherein when the wall-surface detector detects that the wall surface contains regions with different distances to the travel path in plan view, the wall-surface detector derives an average distance of the distances between the regions or extension lines of the regions and the movable body, as a distance between the wall surface and the movable body.

* * * * *